US008284466B2

(12) United States Patent
Sawada

(10) Patent No.: US 8,284,466 B2
(45) Date of Patent: Oct. 9, 2012

(54) IMAGE PROCESSOR FOR CORRECTING IMAGE DATA

(75) Inventor: Kazuhide Sawada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 366 days.

(21) Appl. No.: 12/696,503

(22) Filed: Jan. 29, 2010

(65) Prior Publication Data

US 2010/0195907 A1    Aug. 5, 2010

(30) Foreign Application Priority Data

Jan. 30, 2009    (JP) .................................. 2009-019834

(51) Int. Cl.
G03F 3/08    (2006.01)

(52) U.S. Cl. ......... 358/518; 358/1.9; 358/509; 358/520; 382/167

(58) Field of Classification Search .................. 358/505, 358/509–523; 382/167
See application file for complete search history.

(56) References Cited

U.S. PATENT DOCUMENTS

| | | | |
|---|---|---|---|
| 5,442,408 A | 8/1995 | Haruki | |
| 5,739,809 A | 4/1998 | McLaughlin et al. | |
| 5,956,015 A * | 9/1999 | Hino | 345/600 |
| 6,505,002 B2 * | 1/2003 | Fields | 396/287 |
| 6,614,555 B1 * | 9/2003 | Hidaka | 358/1.9 |
| 6,847,374 B2 | 1/2005 | Matsuda | |
| 6,859,551 B2 * | 2/2005 | Ohga | 382/167 |
| 6,947,079 B2 * | 9/2005 | Parulski et al. | 348/223.1 |
| 6,987,586 B2 * | 1/2006 | Bogdanowicz et al. | 358/1.9 |
| 7,126,610 B2 * | 10/2006 | Hammond | 345/589 |

(Continued)

FOREIGN PATENT DOCUMENTS

JP    H03-250992 A    11/1991

(Continued)

OTHER PUBLICATIONS

Japan Patent Office; Office Action for Patent Application No. 2009-019833, mailed Nov. 9, 2010.

(Continued)

*Primary Examiner* — Benny Q Tieu
*Assistant Examiner* — Quyen V Ngo
(74) *Attorney, Agent, or Firm* — Baker Botts L.L.P.

(57) ABSTRACT

An acquiring unit acquires image data and ambient light data indicating a first color for a first ambient light and a second color for a second ambient light. A third color of a first pixel data is closer to the first color than the second color. A fourth color of a second pixel data is closer to the second color than the first color. A correcting unit corrects the first pixel data such that a third color-appearance of a pixel according to the corrected first pixel data under the second ambient light is perceived as a color-appearance that is the same as a fourth color-appearance of a pixel according to the first pixel data under the first ambient light. The correcting unit corrects the second pixel data such that a fifth color-appearance of a pixel according to the corrected second pixel data under the second ambient light is perceived as a color-appearance that is different from a sixth color-appearance of a pixel according to the second pixel data under the first ambient light and a correction degree by which the correcting unit corrects the second pixel data is less than a correction degree by which the correcting unit corrects the first pixel data.

5 Claims, 6 Drawing Sheets

U.S. PATENT DOCUMENTS

| | | |
|---|---|---|
| 7,595,811 B2 | 9/2009 | Matsuda |
| 2002/0015043 A1 | 2/2002 | Matsuda |
| 2002/0044685 A1 | 4/2002 | Takahashi |
| 2003/0020725 A1 | 1/2003 | Matsuda |
| 2003/0090750 A1 | 5/2003 | Takahashi |
| 2003/0142377 A1 | 7/2003 | Yamada et al. |
| 2004/0085459 A1 | 5/2004 | Hoshuyama et al. |
| 2005/0149864 A1* | 7/2005 | Matsuzaki et al. ............ 715/528 |
| 2006/0187321 A1 | 8/2006 | Sakamoto |
| 2008/0129678 A1* | 6/2008 | Choi et al. .................... 345/102 |
| 2008/0137114 A1 | 6/2008 | Sanami |
| 2008/0303922 A1 | 12/2008 | Chaudhri et al. |
| 2009/0021526 A1 | 1/2009 | Chiang et al. |
| 2009/0195670 A1 | 8/2009 | Koishi |
| 2010/0165137 A1 | 7/2010 | Koishi |
| 2010/0195127 A1 | 8/2010 | Sawada |
| 2010/0195172 A1 | 8/2010 | Sawada |

FOREIGN PATENT DOCUMENTS

| | | |
|---|---|---|
| JP | H03-274884 A | 12/1991 |
| JP | H11-004353 A | 1/1999 |
| JP | 2001-171186 A | 6/2001 |
| JP | 2002-152772 A | 5/2002 |
| JP | 2003-209855 A | 7/2003 |
| JP | 2003-209856 A | 7/2003 |
| JP | 2003-219176 A | 7/2003 |
| JP | 2003-234955 A | 8/2003 |
| JP | 2006-050424 A | 2/2006 |
| JP | 2006-173825 A | 6/2006 |
| JP | 2006-304316 A | 11/2006 |
| JP | 2007-265818 A | 10/2007 |
| JP | 2008-146228 A | 6/2008 |
| WO | 2008/050761 A1 | 5/2008 |

OTHER PUBLICATIONS

Japan Patent Office; Office Action for Patent Application No. 2009-019834, mailed Nov. 9, 2010.

Japan Patent Office; Office Action for Patent Application No. 2009-019835, mailed Jan. 11, 2011.

United States Patent and Trademark Office, Office Action for U.S. Appl. No. 12/696,705 (U.S. Related Patent Application), dated Jul. 30, 2012.

* cited by examiner

| Pi POSITION | REGION A | REGION B | REGION C |
|---|---|---|---|
| CORRECTION AMBIENT LIGHT (Xe, Ye, Ze) | (Xt, Yt, Zt) | {(d−t)×(Xt, Yt, Zt) +t×(Xo, Yo, Zo)}/d | (Xo, Yo, Zo) |

IMAGE PROCESSOR FOR CORRECTING IMAGE DATA

CROSS REFERENCE TO RELATED APPLICATION

This application claims priority from Japanese Patent Application No. 2009-019834 filed Jan. 30, 2009. The entire content of the priority application is incorporated herein by reference.

TECHNICAL FIELD

The present invention relates to an image processor, a computer-readable storage medium storing a computer-executable image-processing program, and an image processing method for correcting image data used to render a printed image so that the colors in the printed image under a reference ambient light are reproduced under ambient light present where the printed image will be viewed.

BACKGROUND

Lighting effects are often employed in stores to make the fruits, vegetables, fish, and other products look better in their displays and in restaurants to make the dishes look more appealing. In general, foods with red colors, such as meats and red vegetables, look more pleasing to the eye under lighting with a low color temperature, while foods with blue colors, such as certain fish, look more pleasing under lighting with a high color temperature. Thus, lighting is commonly selected to apply such visual effects.

One conventional lighting fixture can emit light in a plurality of white colors, such as daylight, cool white, white, warm white, and extra warm white, through a combination of blue LEDs having a high color temperature and yellow LEDs having a low color temperature. With this lighting fixture, it is possible to adjust the color temperature of the lighting according to the application.

SUMMARY

However, it is well known that the same object observed under different ambient light may be perceived to have a different color. Studies have been conducted in the field of printing to determine whether it is possible to eliminate such differences in the way colors of a printed image are perceived when observing the image under different lighting conditions by correcting the image data.

However, while studies have been conducted on reproducing colors under different ambient lighting so that colors appear the same under each type of lighting, no study has yet been conducted on how to correct image data representing an image to be printed so that the printed image is properly perceived in the observation environment.

In view of the foregoing, it is an object of the present invention to provide an image processor, a computer-readable storage medium storing a computer-executable image-processing program, and an image-processing method capable of correcting image data for an image being printed so that the printed image is properly perceived in the observation environment.

In order to attain the above and other objects, there is provided an image processor an acquiring unit and a correcting unit. The acquiring unit acquires image data and ambient light data indicating a first color for a first ambient light and a second color for a second ambient light. A printed image, which corresponds to the image data is perceived in the first ambient light as an image having a first color-appearance. The printed image is perceived in the second ambient light as an image having a second color-appearance. The image data includes a first pixel data indicating a third color and a second pixel data indicating a fourth color. The third color is closer to the first color than the second color. The fourth color is closer to the second color than the first color. The correcting unit corrects the first pixel data such that a third color-appearance of a pixel according to the corrected first pixel data under the second ambient light is perceived as a color-appearance that is the same as a fourth color-appearance of a pixel according to the first pixel data under the first ambient light. The correcting unit corrects the second pixel data such that a fifth color-appearance of a pixel according to the corrected second pixel data under the second ambient light is perceived as a color-appearance that is different from a sixth color-appearance of a pixel according to the second pixel data under the first ambient light and a correction degree by which the correcting unit corrects the second pixel data is less than a correction degree by which the correcting unit corrects the first pixel data.

According to another aspect of the present invention, there is provided a computer-readable storage medium storing a computer-executable image-processing program executable on an image-processor, the image-processing program including:

instructions for acquiring image data and ambient light data indicating a first color for a first ambient light and a second color for a second ambient light, a printed image, which corresponds to the image data, being perceived in the first ambient light as an image having a first color-appearance, the printed image being perceived in the second ambient light as an image having a second color-appearance, the image data including a first pixel data indicating a third color and a second pixel data indicating a fourth color, the third color being closer to the first color than the second color, the fourth color being closer to the second color than the first color; and instructions for correcting the first pixel data such that a third color-appearance of a pixel according to the corrected first pixel data under the second ambient light is perceived as a color-appearance that is the same as a fourth color-appearance of a pixel according to the first pixel data under the first ambient light, and correcting the second pixel data such that a fifth color-appearance of a pixel according to the corrected second pixel data under the second ambient light is perceived as a color-appearance that is different from a sixth color-appearance of a pixel according to the second pixel data under the first ambient light and a correction degree by which the correcting unit corrects the second pixel data is less than a correction degree by which the correcting unit corrects the first pixel data.

According to another aspect of the present invention, there is provided an image-processing method including:

acquiring image data and ambient light data indicating a first color for a first ambient light and a second color for a second ambient light, a printed image, which corresponds to the image data, being perceived in the first ambient light as an image having a first color-appearance, the printed image being perceived in the second ambient light as an image having a second color-appearance, the image data including a first pixel data indicating a third color and a second pixel data indicating a fourth color, the third color being closer to the first color than the second color, the fourth color being closer to the second color than the first color; and correcting the first pixel data such that a third color-appearance of a pixel according to the corrected first pixel data under the second ambient light is perceived as a color-appearance that is the same as a fourth color-appearance of a pixel according to the first pixel data under the first ambient light, and correcting the second pixel data such that a fifth color-appearance of a pixel according to the corrected second pixel data under the second ambient light is perceived as a color-appearance that is different from a sixth color-appearance of a pixel according to the second pixel data under the first ambient light and a correction degree by which the correcting unit corrects the second pixel data is less than a correction degree by which the correcting unit corrects the first pixel data.

DETAILED DESCRIPTION

Next, a preferred embodiment of the present invention will be described while referring to the accompanying drawings.

1. Overall Structure of Communication System

Figure 1:
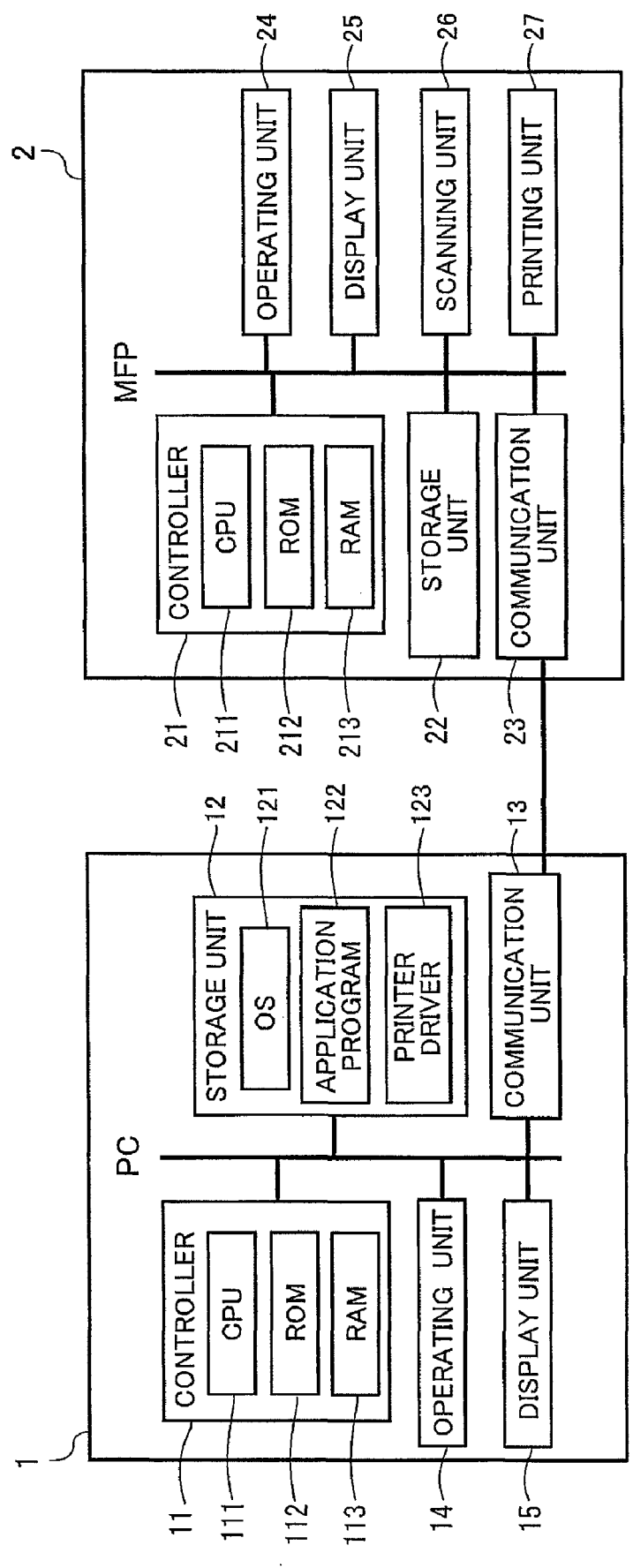
FIG. 1 is a block diagram showing a general structure of a communication system according to an embodiment of the present invention.

FIG. 1 is a block diagram showing the general structure of a communication system including a personal computer (PC) 1, and a multifunction peripheral (MFP) 2 that are capable of performing data communications with each other.

The PC 1 is a common data processor that includes a controller 11, a storage unit 12, a communication unit 13, an operating unit 14, and a display unit 15.

The controller 11 performs overall control of each component in the PC 1. The controller 11 includes a CPU 111, a ROM 112, and a RAM 113.

The storage unit 12 is a rewritable, nonvolatile storage device. In the preferred embodiment, the storage unit 12 is configured of a hard disk drive. The storage unit 12 has various programs installed thereon, including an operating system (OS) 121, an application program 122 for executing an application such as an image-browsing program, and a printer driver 123, which is a program that allows the PC 1 to use the MFP 2.

The communication unit 13 is an interface for performing data communications with the MFP 2.

The operating unit 14 is an input device that allows the user to input instructions through external operations. In the preferred embodiment, the operating unit 14 is configured of a keyboard and a pointing device (a mouse, touchpad, or the like).

The display unit 15 is an output device for displaying various data in a visual form that the user can understand. In the preferred embodiment, the display unit 15 is configured of a liquid crystal display.

The MFP 2 is a printing device that, in addition to a printer function, includes a scanner function, color copier function, and the like. The MFP 2 includes a controller 21, a storage unit 22, a communication unit 23, an operating unit 24, a display unit 25, a scanning unit 26, and a printing unit 27.

The controller 21 performs overall control of each component in the MFP 2. The controller 21 includes a CPU 211, a ROM 212, and a RAM 213.

The storage unit 22 is a rewritable, nonvolatile storage device. In the preferred embodiment, the storage unit 22 is configured of flash memory. The storage unit 22 stores programs for instructing the CPU 211 to implement processes described later with reference to FIGS. 4 and 5.

The communication unit 23 is an interface for performing data communications with the PC 1.

The operating unit 24 is an input device that allows the user to input instructions through external operations. The operating unit 24 includes various operating buttons.

The display unit 25 is an output device for displaying various data in a visual form that the user can understand. A compact liquid crystal display is used as the display unit 25 in the preferred embodiment.

The scanning unit 26 functions to scan images from an original document set in a prescribed scanning position and to generate image data representing the scanned image (more specifically, image data expressed in the RGB color space).

The printing unit 27 functions to print color images by ejecting ink droplets in the colors cyan (C), magenta (M), yellow (Y), and black (K) onto paper.

2. Outline of Processes Executed on Communication System

Next, a brief description will be given of the processes executed on the communication system according to the preferred embodiment.

In the PC 1 according to the preferred embodiment, the printer driver 123 is started when a printing operation is performed in a running application. When the printer driver 123 is started, a dialog box is displayed on the display unit 15 for setting printing conditions. After the user sets printing conditions in this dialog box, the PC 1 (printer driver 123) issues a print command to the MFP 2 and transmits image data representing the target image (and specifically image data expressed in the RGB color space) to the MFP 2. The MFP 2 performs a color conversion process for converting RGB image data received from the PC 1 together with the print command to image data in the CMYK color space, whose colors correspond to the colors of ink in the MFP 2. The MFP 2 subsequently prints an image based on the converted image data (i.e., the CMYK data).

The MFP 2 of the preferred embodiment also prompts the user to set the ambient light used as reference (hereinafter "target ambient light") and the ambient light in which the printed material is to be viewed (hereinafter "observation ambient light"). Subsequently, the MFP 2 prints the image after performing an ambient light correction process for correcting the image data in order that the colors of the printed image under the target ambient light are reproduced under the observation ambient light. That is, a color-appearance of the printed image under the observation ambient light is perceived as a color-appearance that is the same as a color-appearance of the printed image under the target ambient light, by the user.

Figure 2:
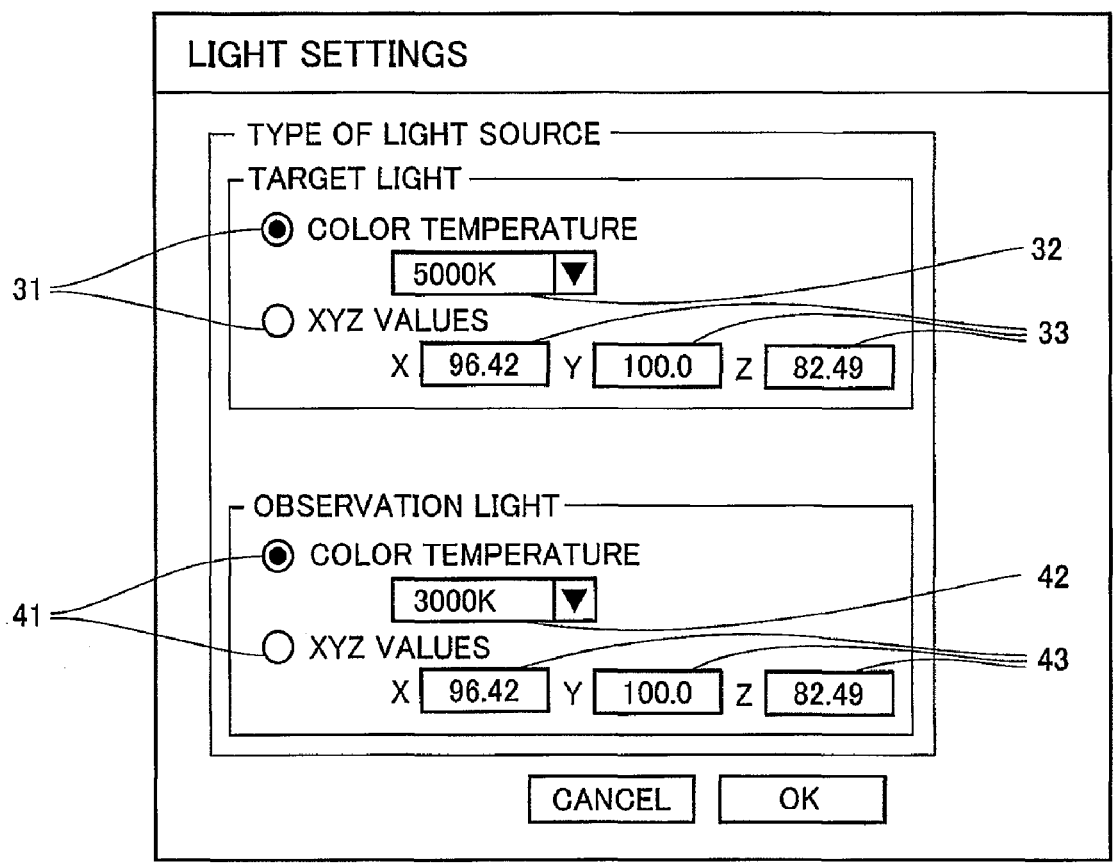
FIG. 2 is an explanatory diagram showing a dialog box of a printer driver according to an embodiment of the present invention.

Specifically, in the dialog box of the printer driver 123 shown in FIG. 2, the user can set various data indicating the target ambient light and the observation ambient light. In the example shown in FIG. 2, the dialog box includes radio buttons 31 and 41 for the target ambient light and the observation ambient light, respectively, that allow the user to select either "Color temperature" or "XYZ values" as the method of specifying ambient light settings. When specifying the color temperature setting method, the user can then select a specific color temperature for the target ambient light and observation ambient light from pull-down boxes 32 and 42. When specifying the XYZ value setting method, the user then inputs specific numbers as X, Y, and Z values in respective numerical input boxes 33 and 43.

The printer driver 123 of the PC 1 then transmits the data set above for the target ambient light and observation ambient light together with a print command to the MFP 2 as target ambient light data ($X_t, Y_t, Z_t$) and observation ambient light data ($X_o, Y_o, Z_o$). XYZ values are also prestored for the color temperatures that can be selected from the pull-down boxes 32 and 42. Therefore, if the user has selected the color temperature method, the printer driver 123 transmits these prestored XYZ values to the MFP 2. Hence, XYZ values representing the color of the target ambient light and the color of the observation ambient light are transferred to the MFP 2, regardless of which setting method was selected. The XYZ values are values within the range 0-100. Before being used by the MFP 2, they are normalized to values within the range 0-1.

By prompting the user to specify the target ambient light and observation ambient light in this way and subsequently performing ambient light correction on the image data, the MFP 2 can mitigate differences in how colors of the printed image are perceived due to differences in ambient light under which the printed image is viewed.

It is a particular feature of the MFP 2 according to the present invention to mitigate the effects of ambient light correction based on colors in the printed image so that the printed image appears favorably in the viewing environment.

In general, foods with red colors, such as meats and red vegetables, look better under lighting with a low color temperature, while foods with blue colors, such as fish, appear better under lighting with a high color temperature, as described earlier. Thus, when printed matter (printed image) 5 includes both fish (blue colors) 5A and meat (red colors) 5B combined in the same image, as shown in the example of FIG. 3A, the red colors of the meat 5B look agreeable while the blue colors of the fish 5A look drab under lighting with a low color temperature (see FIG. 3B), while conversely the blue colors of the fish 5A look agreeable while the red colors of the meat 5B look drab under lighting with a high color temperature.

Therefore, the MFP 2 according to the preferred embodiment performs the normal ambient light correction on one portion of the printed image in which one color-appearance of the one image portion under the observation ambient light is degraded with respect to another color-appearance of the one image portion under the target ambient light so that this one image portion on which the ambient light correction is performed, appears the same color-appearance as that of the one image portion under the target ambient light. On the other hand, the MFP 2 reduces the amount of ambient light correction (the correction degree) performed on another portion of the printed image in which the color-appearance of the another image portion under the observation ambient light is preferable to the color-appearance of the another image portion under the target ambient light so that the favorable color-appearance of the another image portion is achieved under the observation ambient light. Hence, the color-appearance of the another image portion under the observation ambient light is different from the color-appearance of the another image portion under the target ambient light. Here, "reducing the amount of ambient light correction" also includes cases in which the correction amount is set to zero, i.e., ambient light correction is not performed.

Figure 3C:
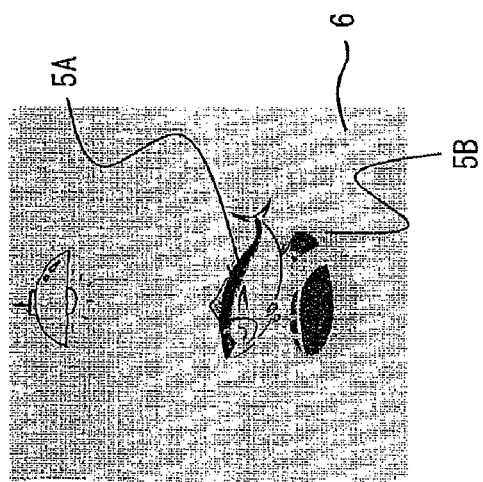
FIGS. 3A-3C are explanatory diagrams explaining differences in how colors of printed image are perceived due to differences in ambient light under which printed image is viewed according to an embodiment of the present invention.
Figure 3B:
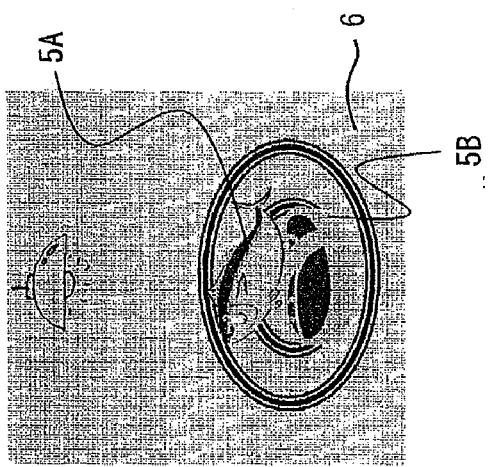
Figure 3A:
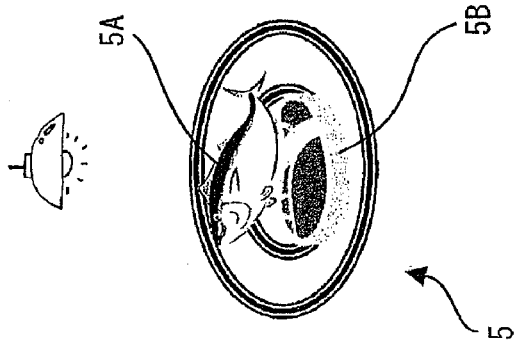

Specifically, when a printed image including both fish 5A (bluish food) and meat 5B (reddish food), as shown in FIG. 3A, is viewed under an observation ambient light 6 having a warm color and a lower color temperature than the target ambient light, the fish 5A will appear drab while the meat 5B appears appetizing (see FIG. 3B). Therefore, when the ambient light correction process is performed for correcting image data of the printed image 5 including the fish 5A and the meat 5B, by reducing the ambient light correction amount in the portion of the printed image containing the meat 5B, the favorable color-appearance of a printed image can be maintained under the observation ambient light 6 (see FIG. 3C).

3. Process Executed by MFP

Next, detailed steps in the process executed on the MFP 2 will be described.

Figure 4:
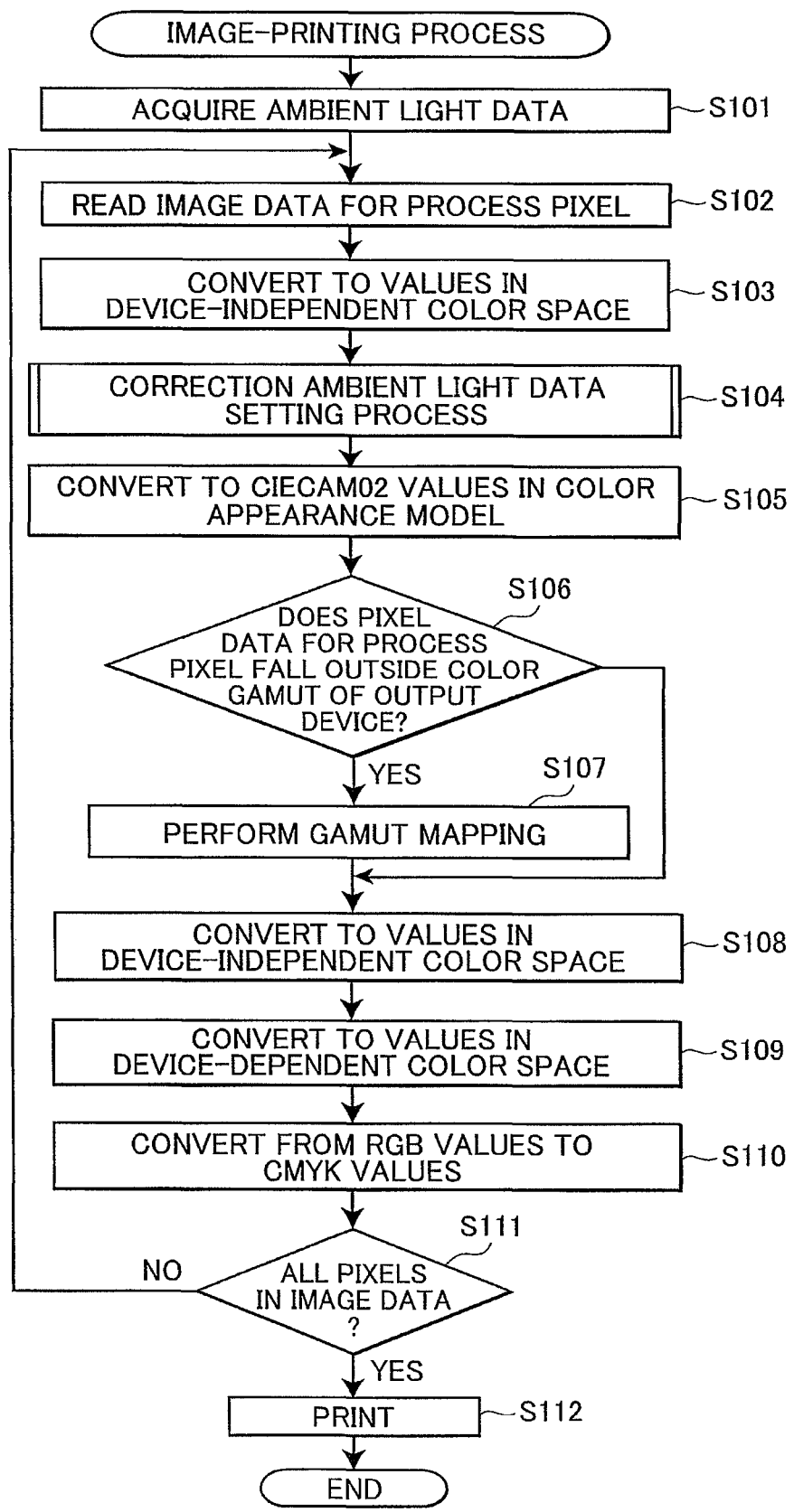
FIG. 4 is a flowchart illustrating steps in an image-printing process according to an embodiment of the present invention.

FIG. 4 is a flowchart illustrating steps in an image-printing process executed by the controller 21 of the MFP 2 (and specifically the CPU 211) when the MFP 2 receives a print command from the PC 1.

In S101 at the beginning of the image-printing process, the controller 21 acquires the target ambient light data ($X_t, Y_t, Z_t$) and the observation ambient light data ($X_o, Y_o, Z_o$). This is the data that the user has previously set using the PC 1.

In S102 the controller 21 specifies a pixel in the image represented by the RGB image data received from the PC 1 that has not yet undergone the process in S103-S110 described next, sets this pixel as the target pixel for this process (hereinafter referred to as the "process pixel") and reads the image data ($R_i, G_i, B_i$) for this process pixel.

In S103 the controller 21 converts the pixel data for the process pixel from RGB values to values in a device-independent color space (XYZ values ($X_i, Y_i, Z_i$) in the preferred embodiment) using an input device profile. In this case, the input device profile is a profile of the display unit 15 in the PC 1.

In S104 the controller 21 performs a correction ambient light data setting process to set correction ambient light data ($X_e, Y_e, Z_e$) to be used in the conversion performed in S105 based on the positional relationship of pixel data for a process pixel in the color space relative to the target ambient light data and the observation ambient light data in the color space of the process pixel data. While the details of the correction ambient light data setting process will be described later with reference to FIG. 5, the process serves to set correction ambient light data to the target ambient light or a value approaching this data for the position in the color space of the process pixel data near the target ambient light data, and to set correction ambient light data to the observation ambient light data or a value approaching this data for the position near the observation ambient light data.

In S105 the controller 21 converts the pixel data (XYZ values) for the process pixel to CIECAM02 values ($J_i, Ca_i, Cb_i$) using the correction ambient light data set in S104.

In S106 the controller 21 determines whether the pixel data, that has the CIECAM02 values (Ji, Cai, Cbi), for the process pixel falls outside the color gamut of the output device. In this case, the output device is the printing unit 27 of the MFP 2.

If the controller 21 determines in S106 that the pixel data falls outside the color gamut of the output device (S106: YES), then the controller 21 performs gamut mapping in S107 before advancing to S108. This gamut mapping may be implemented according to a method well known in the art.

However, if the controller 21 determines in S106 that the pixel data lies inside the color gamut of the output device (S106: NO), the controller 21 skips S107 and advances directly to S108.

In S108 the controller 21 converts the pixel data for the process pixel (CIECAM02 values) to XYZ values (Xj, Yj, Zj) using the ambient light data for the viewing environment. Since the color conversion process performed in S105 to convert XYZ values to CIECAM02 values was implementing using the correction ambient light data set in S104, the controller 21 can perform ambient light correction on image data representing the image being printed so that the colors (the color-appearance) in the printed image under the ambient light represented by the correction ambient light data are reproduced under the observation ambient light. For example, if the target ambient light data is set as the correction ambient light data in S104, the controller 21 performs normal ambient light correction so that colors in the printed image under the target ambient light are reproduced under the observation ambient light. That is, the color-appearance of the printed image under the observation ambient light are perceived as the color-appearance that is the same as a color-appearance of the printed image under the target ambient light. On the other hand, if the observation ambient light data is set as the correction ambient light data in S104, the correction amount for ambient light correction is equal to zero (the ambient light correction does not performed.) in order that the same ambient light data is used when converting XYZ values to CIECAM02 values and when converting CIECAM02 values to XYZ values.

Specifically, the controller 21 sets the correction ambient light data to the target ambient light data or a value approaching this data when the position of the process pixel in the color space of the pixel data is near the target ambient light data and sets the correction ambient light data to the observation ambient light data or a value near this data when the position is near the observation ambient light data, as described above. Hence, the degree of ambient light correction is less when the position of the process pixel in the color space of the pixel data is near the observation ambient light data than when the position is near the target ambient light data.

In S109 the controller 21 converts the pixel data for the process pixel from the XYZ values to RGB values (Rj, Gj, Bj), which are values in a device-dependent color space, using the output device profile.

In S110 the controller 21 converts the pixel data for the process pixel from RGB values to CMYK values (Cj, Mj, Yj, Kj) using a three-dimensional look-up table (3D LUT).

In S111 the controller 21 determines whether the process in S103-S110 has been completed for all pixels in the image data.

If the process has not been performed on all pixels of the image data, the controller 21 returns to S102 (S111: NO), specifies a different pixel that has not yet been processed as the process pixel, and repeats the process in S103-S110.

However, if the controller 21 determines in S111 that the process has been completed for all pixels (S111: YES), in S112 the controller 21 performs a process to print an image based on the pixel data sets acquired by the process in S102-S110, and subsequently ends the current image-printing process.

Figure 5:
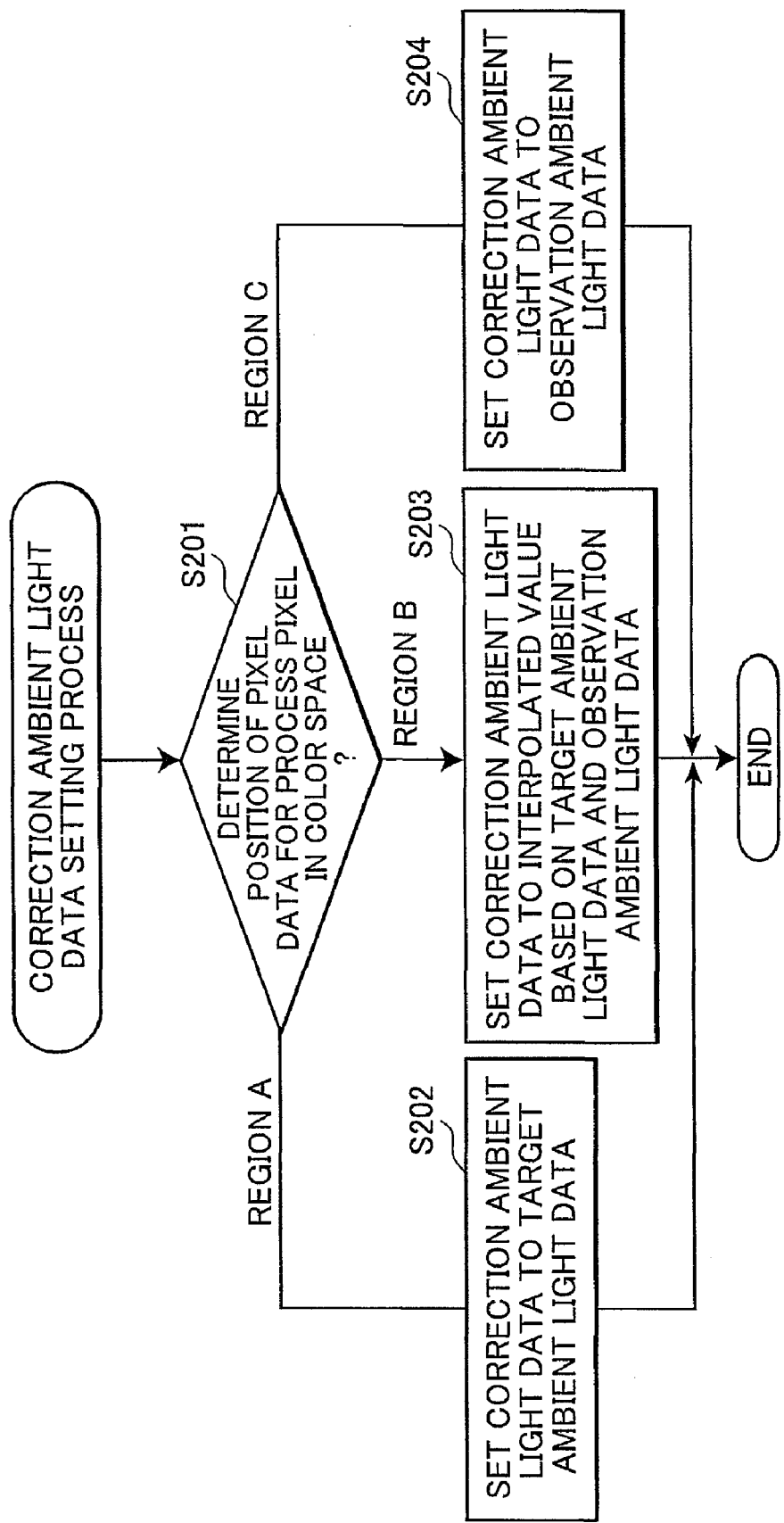
FIG. 5 is a flowchart illustrating steps in a correction ambient light data setting process according to an embodiment of the present invention.

Next, the correction ambient light data setting process executed by the controller 21 in S104 of the image-printing process described above will be described with reference to the flowchart in FIG. 5.

Figure 6:
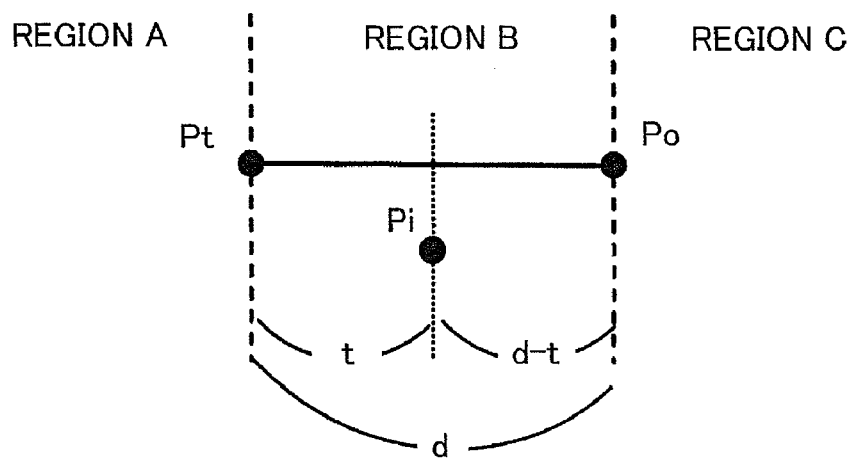
FIG. 6 is an explanatory diagram showing a relative position of pixel data for process pixel in CIE 1931 xy chromaticity diagram with respect to target ambient light data and observation ambient light data.

In S201 at the beginning of the correction ambient light data setting process, the controller 21 determines the position of pixel data (Xi, Yi, Zi) for the process pixel in the color space (CIE 1931 xy chromaticity diagram) with respect to the target ambient light data (Xt, Yt, Zt) and the observation ambient light data (Xo, Yo, Zo). Specifically, the controller 21 determines which of three regions that pixel data Pi for the process pixel belongs in the xy chromaticity diagram. As shown in FIG. 6, the three regions are divided by two lines passing through a point Pt of the target ambient light data and a point Po of the observation ambient light data that are normals to the line segment connecting the points Pt and Po. These lines represent where the effects of the lighting change. Here, region A is the region on the Pt side, region C the region on the Po side, and region B the region in the middle. The points Pt and Po are connected by a straight line (line segment) because it is presumed that a portion of the black-body radiation curve approaches a straight line.

If the controller 21 determines in S201 that the pixel data Pi for the process pixel belongs to region A, in S202 the controller 21 sets the correction ambient light data to the target ambient light data (see Equation (1) below). Subsequently, the controller 21 ends the correction ambient light data setting process.

Equation (1)

$$(Xe, Ye, Ze) = (Xt, Yt, Zt) \tag{1}$$

If the controller 21 determines in S201 that the pixel data Pi for the process pixel belongs to region B, in S203 the controller 21 sets the correction ambient light data to an interpolated value based on the target ambient light data and the observation ambient light data (see Equation (2) below). Subsequently, the controller 21 ends the correction ambient light data setting process.

Equation (2)

$$(Xe, Ye, Ze) = \{(d-t) \times (Xt, Yt, Zt) + t \times (Xo, Yo, Zo)\}/d \tag{2}$$

If the controller 21 determines in S201 that the pixel data Pi for the process pixel belongs to region C, in S204 the controller 21 sets the correction ambient light data to the observation ambient light data (see Equation (3) below). Subsequently, the controller 21 ends the correction ambient light data setting process.

Equation (3)

$$(Xe, Ye, Ze) = (Xo, Yo, Zo) \tag{3}$$

By setting the correction ambient light data according to this method, the controller 21 does not reduce the degree of ambient light correction performed on pixel data Pi belonging to region A on the target ambient light side, does not perform ambient light correction on pixel data Pi belonging to region C on the observation ambient light side by setting the degree of ambient light correction to the minimum value, and reduces the degree of ambient light correction more for pixel data Pi belonging to the middle region B that approach the color of the observation ambient light.

(4) Effects of the Embodiment

As described above, the MFP 2 according to the preferred embodiment performs ambient light correction to correct image data representing an image to be printed so that the colors in the printed image under the target ambient light are reproduced under the observation ambient light. Here, the controller 21 uses a lesser degree of ambient light correction on one pixels in the image than another pixels in the image. The one pixels have colors closer to the color of the observation ambient light than the color of the target ambient light. The another pixels have colors closer to the color of the target ambient light than the color of the observation ambient light.

Accordingly, the MFP 2 according to the preferred embodiment does not simply correct the difference in how colors of the printed image appear due to a difference in the ambient light at which the printed image is observed, but reduces the degree of correction for pixels whose color is close to the color of the observation ambient light, thereby allowing the lighting effect of the observation ambient light to enhance the image while suppressing any negative effect the lighting may have on the appearance of the image. Specifically, images having colors closer to the color of the observation ambient light than the color of the target ambient light appear more favorably under the observation ambient light than images having colors closer to the color of the target ambient light. Conversely, images having colors closer to the color of the target ambient light appear less pleasing under the observation ambient light than images having colors closer to the color of the observation ambient light. Therefore, by reducing the degree of ambient light correction on images whose colors appear more favorably under the observation ambient light, the MFP 2 can maintain this favorable color-appearance while suppressing degradation of images whose colors are not pleasing under the observation ambient light through ambient light correction.

Further, the MFP 2 according to the preferred embodiment can set an appropriate degree of ambient light correction by setting correction ambient light data as a parameter for adjusting the degree of ambient light correction based on the positional relationship of image data for the process pixel in the color space relative to the target ambient light data and the observation ambient light data. Specifically, by reducing the degree of ambient light correction for pixels belonging to the middle region B in FIG. 6 as the color of the pixel approaches the color of the observation ambient light, the MFP 2 can more reliably reduce the chance of corrected image colors appearing unnatural than when simply selecting between performing ambient light correction and not performing ambient light correction.

6. Another Embodiment

While the invention has been described in detail with reference to the specific embodiment thereof, it would be apparent to those skilled in the art that various changes and modifications may be made therein without departing from the spirit of the invention.

6-1. Color Space

In the preferred embodiment described above, gamut mapping is performed after converting the RGB values to CIECAM02 values. However, the color space in which gamut mapping is performed may be any uniform color space and is not limited to the CIECAM02 color space. A uniform color space is constructed so that the color difference perceived by humans is comparable to the Euclidean distance in the color space. Other examples of uniform color spaces are CIELAB and CIELUV.

6-2. Image-Printing Process

In the preferred embodiment described above, the MFP 2 performs an image-printing process based on the sequence of steps in S101-S112. However, this process may be simplified by first creating an LUT that defines correlations between the pixel data prior to executing the process in S103-S110 and the pixel data after executing these processes.

6-3. Image Data

In the preferred embodiment described above, the image data inputted in the MFP 2 is expressed in the RGB color space. However, the present invention may be applied to inputted image data expressed in another color space.

Further, it is not essential that the image data is transferred from the PC 1, as described in the preferred embodiment. For example, the image data may be generated by the scanning unit 26 of the MFP 2 or may be read from a memory card or other portable storage media when the MFP 2 is capable of directly reading image data from such media. Further, the MFP 2 may be configured to prompt the user to set ambient light data for the target and ambient light data for the observation environment so that the ambient light correction process can be executed on the MFP 2 without the MFP 2 being connected to the PC 1.

6-4. Ambient Light Data

In the preferred embodiment described above, the user is prompted to set ambient light data for a target and an observation environment as color temperatures or XYZ values. However, the user may also be allowed to select a type of lighting, for example, such as fluorescent lighting, incandescent lighting, and the like. Such a selection method may be more user-friendly than setting the color temperature.

It is also not essential that the user be required to set the ambient light data for the target and the observation environment. For example, the MFP 2 may be provided with a sensor for measuring ambient light and may automatically set the ambient light data based on the measured values. In this case, the MFP 2 may measure the ambient light data of the target using the sensor, while the user is prompted to input ambient light data for the observation environment.

6-5. Printing Unit

In the preferred embodiment described above, the printing unit 27 is an inkjet device that prints images using the four ink colors C, M, Y, and K. However, the printing unit may be configured to use more colors of ink, for example. Further, the colorant is not limited to ink. For example, the printing unit may have a laser transfer system for forming images using toner in a plurality of colors.

6-6. Image Processor

In the preferred embodiment described above, the MFP 2 serves as an example of the image processor according to the present invention. However, the image processor may be a printing device that does not have a scanner function or the like. Further, the image processor is not limited to a printing device. For example, the PC 1 may also function as the image processor of the present invention. In this case, the printer driver 123 in the PC 1 executes the process described in S101-S111, for example, and the PC 1 subsequently transfers the processed image data to the MFP 2 for printing.

What is claimed is:

1. An image processing device comprising:
    an acquiring unit that acquires image data and ambient light data indicating a first color for a first ambient light and a second color for a second ambient light, a printed image, which corresponds to the image data, being perceived in the first ambient light as an image having a first color-appearance, the printed image being perceived in the second ambient light as an image having a second color-appearance, the image data including a first pixel data indicating a third color and a second pixel data indicating a fourth color, the third color being closer to the first color than the second color, the fourth color being closer to the second color than the first color; and
    a correcting unit that corrects the first pixel data such that a third color-appearance of a pixel according to the corrected first pixel data under the second ambient light is perceived as a color-appearance that is the same as a fourth color-appearance of a pixel according to the first pixel data under the first ambient light, and corrects the second pixel data such that a fifth color-appearance of a pixel according to the corrected second pixel data under the second ambient light is perceived as a color-appearance that is different from a sixth color-appearance of a pixel according to the second pixel data under the first ambient light and a correction degree by which the correcting unit corrects the second pixel data is less than a correction degree by which the correcting unit corrects the first pixel data.

2. The image processing device according to claim 1, wherein the correcting unit divides a color space into three region based on positions of the first color and the second color in the color space, the three region having a first region, a second region, and a third region, the first region being a region between the positions of the first color and the second color, the second region being a region on an opposite side of the first region with respect to the position of the first color, the third region being a region on an opposite side of the first region with respect to the position of the second color, the image data including a third pixel data indicating a fifth color, a fourth pixel data indicating a sixth color, and a fifth pixel data indicating a seventh color, and
    wherein, if a position of the fifth color belongs to the second region, the correcting unit corrects the third pixel data such that a correction degree by which the correcting unit corrects the third pixel data is equal to the correction degree by which the correcting unit corrects the first pixel data, if a position of the sixth color belongs to the third region, the correcting unit fails to correct the fourth pixel data, and if a position of the seventh color belongs to the first region, the correcting unit corrects the fifth pixel data such that a correction degree by which the correcting unit corrects the fifth pixel data is reduced more as the position of the seventh color approaches the position of the second color.

3. The image processing device according to claim 2, wherein the color space is a CIE 1931 xy chromaticity diagram, and
    wherein the three regions are divided by two lines passing through positions of the first color and the second color in the CIE 1931 xy chromaticity diagram respectively, the two lines being normals to a line segment connecting the positions of the first color and the second color.

4. A non-transitory computer-readable storage medium storing a computer-executable image-processing program executable on an image-processor, the image-processing program comprising:
    instructions for acquiring image data and ambient light data indicating a first color for a first ambient light and a second color for a second ambient light, a printed image, which corresponds to the image data, being perceived in the first ambient light as an image having a first color-appearance, the printed image being perceived in the second ambient light as an image having a second color-appearance, the image data including a first pixel data indicating a third color and a second pixel data indicating a fourth color, the third color being closer to the first color than the second color, the fourth color being closer to the second color than the first color; and
    instructions for correcting the first pixel data such that a third color-appearance of a pixel according to the corrected first pixel data under the second ambient light is perceived as a color-appearance that is the same as a fourth color-appearance of a pixel according to the first pixel data under the first ambient light, and correcting the second pixel data such that a fifth color-appearance of a pixel according to the corrected second pixel data under the second ambient light is perceived as a color-appearance that is different from a sixth color-appearance of a pixel according to the second pixel data under the first ambient light and a correction degree by which the correcting unit corrects the second pixel data is less than a correction degree by which the correcting unit corrects the first pixel data.

5. A method executed by an image processing device, the method implementing functions of the image processing device comprising:
    acquiring image data and ambient light data indicating a first color for a first ambient light and a second color for a second ambient light, a printed image, which corresponds to the image data, being perceived in the first ambient light as an image having a first color-appearance, the printed image being perceived in the second ambient light as an image having a second color-appearance, in the second ambient light, the image data including a first pixel data indicating a third color and a second pixel data indicating a fourth color, the third color being closer to the first color than the second color, the fourth color being closer to the second color than the first color; and
    correcting the first pixel data such that a third color-appearance of a pixel according to the corrected first pixel data under the second ambient light is perceived as a color-appearance that is the same as a fourth color-appearance of a pixel according to the first pixel data under the first ambient light, and correcting the second pixel data such that a fifth color-appearance of a pixel according to the corrected second pixel data under the second ambient light is perceived as a color-appearance that is different from a sixth color-appearance of a pixel according to the second pixel data under the first ambient light and a correction degree by which the correcting unit corrects the second pixel data is less than a correction degree by which the correcting unit corrects the first pixel data.

* * * * *